United States Patent
Kitayoshi et al.

(10) Patent No.: US 8,493,181 B2
(45) Date of Patent: Jul. 23, 2013

(54) SENSOR TAG, SENSOR TAG DEVICE, POWER RECEIVING CIRCUIT, AND SENSOR TAG DEVICE POWER SUPPLY METHOD

(76) Inventors: Hitoshi Kitayoshi, Miyagi (JP); Kunio Sawaya, Miyagi (JP)

( * ) Notice: Subject to any disclaimer, the term of this patent is extended or adjusted under 35 U.S.C. 154(b) by 1217 days.

(21) Appl. No.: 11/995,691

(22) PCT Filed: Jul. 14, 2006

(86) PCT No.: PCT/JP2006/314095
§ 371 (c)(1),
(2), (4) Date: Mar. 10, 2008

(87) PCT Pub. No.: WO2007/010869
PCT Pub. Date: Jan. 25, 2007

(65) Prior Publication Data
US 2009/0121837 A1 May 14, 2009

(30) Foreign Application Priority Data
Jul. 15, 2005 (JP) .................. 2005-207464

(51) Int. Cl.
*H04Q 5/22* (2006.01)
(52) U.S. Cl.
USPC ..... 340/10.1; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385
(58) Field of Classification Search
USPC ... 340/10.1–10.6, 572.1–572.9; 235/375–385
See application file for complete search history.

(56) References Cited

U.S. PATENT DOCUMENTS

| | | | | | |
|---|---|---|---|---|---|
| 4,236,199 | A | * | 11/1980 | Stewart | 363/60 |
| 4,992,922 | A | * | 2/1991 | Ishimura et al. | 363/59 |
| 5,274,271 | A | * | 12/1993 | McEwan | 307/108 |
| 5,325,105 | A | * | 6/1994 | Cermignani et al. | 343/786 |
| 5,383,109 | A | * | 1/1995 | Maksimovic et al. | 323/222 |
| 5,570,279 | A | * | 10/1996 | Venkataramanan | 363/127 |
| 5,625,549 | A | * | 4/1997 | Horvat | 363/132 |
| 5,633,793 | A | * | 5/1997 | Lee et al. | 363/127 |
| 5,742,151 | A | * | 4/1998 | Hwang | 323/222 |
| 5,801,517 | A | * | 9/1998 | Borle | 323/207 |

(Continued)

FOREIGN PATENT DOCUMENTS

| | | | | |
|---|---|---|---|---|
| JP | 05243840 | A | * | 9/1993 |
| JP | 10075105 | A | * | 3/1998 |

(Continued)

*Primary Examiner* — George Bugg
*Assistant Examiner* — Paul Obiniyi
(74) *Attorney, Agent, or Firm* — Young & Thompson (57) ABSTRACT

There is provided a sensor tag device capable of detecting event data by a sensor tag all the time even when no radio wave is received, saving power supply for a microprocessor, and enlarging the radio communication distance. The sensor tag device includes generation means 6 and 7 using one or more environmental changes, power supply voltage rise control means 8, and power supply synthesis means 9, and power is supplied to a microprocessor 12 and event data is stored in the microprocessor 12 when an event, i.e., an environmental change has occurred. A power receiving circuit having a transmission/reception antenna, a built-in power receiving circuit, and the microprocessor and capable of bi-directional communication by radio waves is combined with a stab resonance RF boost circuit and a ladder boost rectification circuit.

20 Claims, 5 Drawing Sheets

U.S. PATENT DOCUMENTS

| | | | |
|---|---|---|---|
| 5,903,138 A * | 5/1999 | Hwang et al. | 323/266 |
| 6,144,981 A * | 11/2000 | Kovacs et al. | 708/819 |
| 6,150,921 A * | 11/2000 | Werb et al. | 340/10.1 |
| 6,240,147 B1 * | 5/2001 | Muramatsu et al. | 375/344 |
| 6,812,824 B1 * | 11/2004 | Goldinger et al. | 340/10.1 |
| 6,856,819 B2 * | 2/2005 | Itoh | 455/575.7 |
| 7,498,897 B2 * | 3/2009 | Yoshida et al. | 333/33 |
| 7,808,335 B2 * | 10/2010 | Hemmert | 331/167 |
| 2001/0021643 A1 * | 9/2001 | Itoh | 455/90 |
| 2005/0071441 A1 * | 3/2005 | Komatsuzaki et al. | 709/220 |
| 2005/0280509 A1 * | 12/2005 | Tanaka et al. | 340/10.3 |
| 2006/0214765 A1 * | 9/2006 | Pitchers et al. | 340/3.4 |
| 2007/0057771 A1 * | 3/2007 | Tomioka | 340/10.1 |
| 2008/0036662 A1 * | 2/2008 | Iwata et al. | 343/700 MS |

FOREIGN PATENT DOCUMENTS

| | | | |
|---|---|---|---|
| JP | 11-261339 A | | 9/1999 |
| JP | 11261339 A | * | 9/1999 |
| JP | 2005-228714 A | | 8/2005 |
| JP | 2005228714 A | * | 8/2005 |
| JP | 2009027734 A | * | 2/2009 |

* cited by examiner

SENSOR TAG, SENSOR TAG DEVICE, POWER RECEIVING CIRCUIT, AND SENSOR TAG DEVICE POWER SUPPLY METHOD

TECHNICAL FIELD

The present invention relates to a sensor tag, and more particularly to a sensor tag device which is used in, e.g., a passive type wireless tag device with a sensor having no battery, and stores an event occurrence factor, sensor data (e.g., event detection data), and event information, e.g., an event occurrence time in an internal nonvolatile memory when, e.g., an event occurs, and wirelessly sends back the stored information with respect to an inquiry wirelessly supplied from an inquirer.

BACKGROUND ART

Patent Document 1: Japanese Patent Application Laid open No. 2000-258254 "Temperature Recording Device"

There is a sensor tag device as a device, which is disposed to an article or a container to measure information of a time that varies every second at regular time intervals and from which a temperature history can be read at a later stage by utilizing a wireless communication line.

This sensor tag device can be disposed to many kinds of objects or places extensively and information can be readily read therefrom. Therefore, it can be considered that this device becomes an element technology, which realizes a radically new infrastructure in a future network society, which is called a sensor fusion if network connection can be achieved.

At the present time, an active type sensor tag device having a battery or a passive type sensor tag which is utilized at a short range of approximately several-ten cm without having a history function has been mainly studied and developed.

Thus, it is considered that an application range can be further widened if a passive type sensor tag device which has a history function without a battery and from which information can be read at a position distanced by 10 m or more can be realized. It is to be noted that an inquirer is used for such a reading operation.

For example, there is a situation where confirming a history of a change in an ambient temperature or a history of, e.g., light/vibrations at a later stage is desirable in regard to foods or some of industrial products, or a situation where confirming a history of, e.g., a load (strain or acceleration) on buildings or large constructions after an earthquake and others at a later stage is desirable. It is to be noted that various kinds of conditions, e.g., a monitoring target/history target, which varies depending on each industry segment, will be referred to as events hereinafter.

Figure 5:
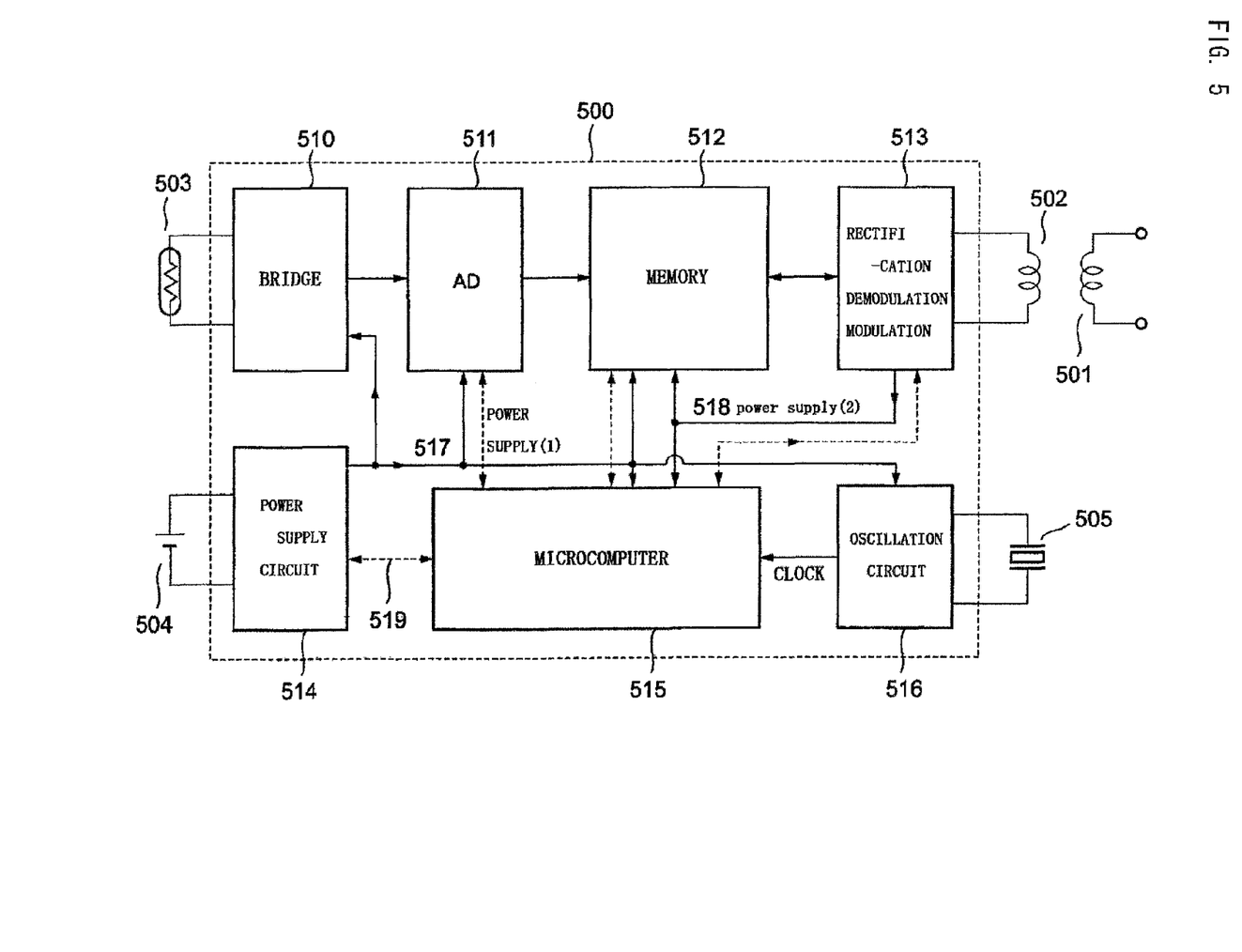
FIG. 5 is a block diagram of a conventional active type sensor tag device.

Extensively arranging many kinds of sensor tag devices, which do not require maintenance, e.g., replacing a battery in this manner enables constructing a new information system or safety management system that FIG. 5 is a block diagram of a sensor tag device showing a conventional sensor tag device disclosed in Patent Document 1.

A thermistor 503 is connected with an internal bridge, and its output temperature signal is converted into digital information by an AD converter 511. This operation is intermittently performed, and its output information is stored in a non-volatile memory 512 A temperature recording interval is set by an external command. These operations are controlled by a microcomputer 515 and necessary arithmetic operations are executed. Further, its operation power is supplied through a supply path 517 designated as a power supply (1) from a power supply circuit 514. During this period, necessary clocks are constantly supplied from an oscillation circuit 516.

In the sensor tag device, although an internal measurement recording circuit operates with a power supplied from a battery 504 in a short period where a temperature is measured and recorded, minimum circuits, e.g., a clock circuit and a monitoring circuit alone operate in an idle period between such periods to suppress wastage of the battery.

When controlling this device from the outside and reading Information, a high-frequency current modulated based on a digital signal is flowed to a coil 501 from an external reader/writer. A coil 502 senses this current to demodulate digital information and supplies it to a microcomputer 515. At the same time, a high-frequency electromotive force induced in the coil 502 is rectified and smoothed to turn to a power, and it is supplied to a memory 512 and the microcomputer 515 through a supply path 518 designated as a power supply (2). The above-explained operation enables issuing a command, e g., initial setting or starting reading to the device side. It is to be noted that an arrow 519 of a dotted line or the like in FIG. 5 denotes a flow of information.

When returning information to the outside from the device side, the information is read from the memory based on a command from the microcomputer 515, modulated to a high frequency by a rectification/demodulation/modulation circuit 513, and supplied to the outside. This modulation mode is a mode of modulating a high frequency supplied from the outside through the coil 501, thereby avoiding wastage of the battery 504 without requiring an internal power It is to be rioted that modulating and using a high frequency oscillated inside in place of modulating a high frequency supplied from the outside through the coil 501 enables assuring a large distance from the reader/writer (inquirer). However, in this case, since an oscillation power is supplied from the battery 504, a consumption amount of the battery is increased

DISCLOSURE OF INVENTION

Problem to be Solved by the Invention

Meanwhile, such a structure provides an active type having the built-in primary battery or secondary battery 504, and it has the following drawbacks since power feeding and communication are performed based on electromagnetic induction.

(1) An internal timer circuit must be constantly operated, and a power is constantly consumed, thus requiring periodic battery replacement or charging.

(2) Wireless communication must be performed between the sensor tag and the inquirer at a short range of approximately several-ten cm to effect charging and communication based on electromagnetic induction.

Thus, in view of the above-explained actual conditions, it is an object of the present invention to realize a sensor tag device which does not require maintenance, e.g., battery replacement and from which information can be read at a position that is distanced by 10 m or more.

Means for Solving Problem

A sensor tag according to claim 1 is characterized in that a power receiving circuit includes a transmission/reception antenna, a power receiving circuit, and a microprocessor, and the power receiving circuit enabling bi-directional communication is combined with a stab resonance RF boost circuit and a ladder boost rectification circuit.

That is, a battery is used to operate a timer circuit and a time is thereby measured in a conventional mode, whereas a discharge phenomenon of a time constant circuit is utilized to measure a time without using a battery in the present invention.

The sensor tag according to claim 2 is characterized in that a divided microstrip antenna is used as the transmission/reception antenna.

Further, charging and communication are performed based on electromagnetic induction in a conventional mode, whereas the present invention adopts a power receiving and communication mode using electric waves in which an ASK demodulation circuit, a charge pump, and a reset circuit are added to a circuit having a combination of the divided microstrip antenna, a stab resonator, and a ladder boost rectification mode.

The sensor tag according to claim 3 is characterized in that a divided position of a strip conductor of the divided microstrip antenna deviates from the center of a length of the strip conductor.

The sensor tag according to claim 4 is characterized in that a signal is taken out from a middle stage of the ladder boost rectification circuit, and a part of the power receiving circuit is utilized as an ASK demodulation circuit.

The sensor tag according to claim 5 is characterized in that an output signal from the ASK demodulation circuit is utilized and an output voltage from a last stage of the ladder boost rectification circuit is charge-pumped to serve as a power supply voltage of the microprocessor The sensor tag according to claim 6 is characterized in that a power sufficient for initialization and a reception sequence operation is supplied to the microprocessor by inputting a reset signal to the microprocessor in synchronization with the charge pump operation.

The sensor tag according to claim 7 is characterized in that the reset signal is transmitted from an inquirer in a cycle T, and the microprocessor enables an output required to continuously supply a power after end of a power supply ON sequence and then resets an. internal power flag, sets a timer waiting period slightly shorter than the reset cycle T, and thereafter sets the internal power flag at the end of the timer waiting period to detect that a power supply voltage is equal to or above a stable operation threshold value of the microprocessor.

The sensor tag according to claim 8 is characterized in that a primary delay circuit having a long time constant and a primary delay circuit having a short time constant are used with respect to the ASK demodulation signal to take out and utilize a reset signal and a serial data signal.

A sensor tag device according to claim 9 is characterized in that the sensor tag device has: generation means for utilizing one or more changes in an environment; power supply voltage rise control means; and power supply synthesis means, and a change in the environment is determined as an event, a power is supplied to a microprocessor and event data is stored in the microprocessor at the same time when this event occurs.

The sensor tag device according to claim 10 is characterized in that the sensor tag device has a time constant circuit that can be charged with electric charges under control of the microprocessor, and the microprocessor reads information of a time elapsed from charging.

A sensor tag device according to claim 11 is characterized in that the sensor tag device comprises the sensor tag according to any one of claims 1 to 8 and has: generation means for utilizing one or more changes in an environment; power supply voltage rise control means; and power supply synthesis means, and a change in the environment is determined as an event, a power is supplied to a microprocessor and event data is transmitted at the same time to be stored in the microprocessor when this event occurs.

The sensor tag device according to claim 12 is characterized in that the sensor tag device has a time constant circuit that can be charged with electric charges under control of the microprocessor, and the microprocessor reads information of a time elapsed from charging.

The sensor tag device according to claim 13 is characterized in that an event factor and sensor data are wirelessly sent back with respect to an inquirer carrier signal when, an event occurs.

The sensor tag device according to claim 14 is characterized in that an event factor, sensor data, and information of an occurrence time are stored in a non-volatile memory in the microprocessor when an event occurs, and such information is wirelessly sent back when the inquirer inquires.

The sensor tag device according to claim 15 is characterized in that time information and sensor information in the tag are stored in the non-volatile memory in the microprocessor when the inquirer issues a writing request, and such information is wirelessly sent back when the inquirer inquires.

A power receiving circuit according to claim 16 is characterized in that the power receiving circuit is a circuit which includes a stab resonator and a ladder boost rectification circuit, is connected with an antenna power feed point through a capacitive power feed impedance, and boosts and rectifies an input signal supplied from the antenna power feed point to feed a power to an external load, wherein the power receiving circuit resonates the stab resonator and the capacitive power feed impedance in series and resonates the stab resonator and a capacitive load impedance formed of the ladder boost rectification circuit in parallel.

The power receiving circuit according to claim 17 is characterized in that, in a Cockcroft-Walton circuit formed of a plurality of diodes, a plurality of ground-side capacitors, and a plurality of power-receiving-side capacitors, the ladder boost rectification circuit is a circuit in which a first diode on an input side is removed and a capacitance value of each power-receiving-side capacitor is smaller than a capacitance value of each ground-side capacitor.

A sensor tag device power supply method according to claim 18 is characterized in that the sensor tag device comprises a stab resonator and a ladder boost rectification circuit, and the method comprises: achieving connection through an antenna power feed point and a capacitive power feed impedance; resonating the stab resonator and the capacitive power feed impedance in series and resonating the stab resonator and a capacitive load impedance formed of the ladder boost rectification circuit in parallel; and boosting and rectifying an input signal supplied from the antenna power feed point to feed a power to an external load.

Effect Of The Invention

According to the invention defined in claim 1, since charging and communication based on electromagnetic induction do not have to be performed, a long wireless communication distance can be assured.

According to the invention defined in claim 2, a receiving efficiency of the transmission/reception antenna can be improved.

According to the invention defined in claim 3, the receiving efficiency of the transmission/reception antenna can be further improved.

According to the invention defined in claim 4, since the power receiving circuit and the ASK demodulation circuit can be used in common, a circuit configuration can be simplified, and a utility value of a received electric wave energy can be increased.

According to the invention defined in claim 5, a general-purpose product can be used as the microprocessor, the microprocessor can be operated even if a driving power source with a lower power and a low load (e.g., 1.0 V and a load of 2 μA, i.e., approximately 500 KΩ) is adopted, and the wireless communication distance can be further increased with realization of a low power.

According to the invention defined in claim 6, operating conditions can be satisfied by increasing a power supply voltage and reducing an output impedance in accordance with a timing where a maximum power consumption is demanded.

For example, when a load of 50 KΩ must be driven at 1.8 V in a 1% section of an entire operating time and driving a load of approximately 500 KΩ at 1.0 V in the remaining 99% section can suffice, a power supply that constantly drives the load of 50 KΩ at 1.8 V is not required, and driving the load of 50 KΩ at 1.8 V in the 1% section alone can suffice if a power supply that drives the load of 500 KΩ at 1.0 V is present.

This is a very important matter for a passive type wireless tag that operates with supply of a very weak power based on electric waves, and using claims 1 to 3 and this claim of the present invention enables the sensor tag whose available distance is 3 m or below in, e.g., a band of 2.45 GHz to be utilized at a distance of approximately 30 m.

According to the invention defined in claim 7, unnecessary responses due to erroneous operations can be reduced.

According to the invention defined in claim 8, since the data signal and the reset signal are separated on a stage of input signals to the microprocessor, a reset operation can be assuredly performed even if the microprocessor is erroneously operating, and a normal operation of the microprocessor can be assured, thereby realizing further stability of a tag operation.

According to the invention defined in claim 9, an event which can be detected by the active type sensor tag device alone can be detected by the passive type sensor tag even in a state where electric waves are not received, and supply of a power to the microprocessor can be economized, thereby increasing a wireless communication distance.

According to the invention defined in claim 10, measurement of a time, which can be performed by the active type sensor tag alone, can be realized by the passive type sensor tag even in a state where electric waves are not received.

According to the invention defined in claim 11, logging of sensing data performed by the active type sensor tag device alone every time an event occurs can be realized by the passive type sensor tag device even in a state where electric waves are not received.

According to the invention defined in claim 12, detection of an event occurrence time performed by the active type sensor tag device alone can be realized by the passive type sensor tag device.

According to the invention defined in claim 13, detection of an event in real time and notification of sensing data performed by the active type sensor tag device alone can be realized by the passive type sensor tag device.

According to the invention defined in claim 14, wherein logging of event data performed by the active type sensor tag device alone every time an event occurs can be realized by the passive type sensor tag device even in a state where elective waves are not received.

According to the invention defined in claim 15, logging of sensing data performed by the active type sensor tag device alone with respect to each measurement request command can be realized by the passive type sensor tag device.

According to the invention defined in claim 16, a high output voltage can be supplied to a load with a smaller number of circuit elements. For example, when the power receiving circuit according to the present invention is used in a device, e.g., an RFID tag device or a sensor tag device to which a high-voltage power must be fed with a weak signal received from an antenna, an effect of improving high-voltage power feed and a power conversion efficiency can be demonstrated. Furthermore, a high Q value can be realized and the power conversion efficiency can be improved by using the stab resonator as an L of a resonance circuit and resonating the capacitive impedance of the ladder rectification circuit and the stab in parallel.

According to the invention defined in claim 17, an input load carrying capacity can be reduced, and a high-frequency high impedance can be received in a direct-current short circuit.

According to the invention defined in claim 18, senor fusion, which can be realized by the active type sensor tag device alone, can be also realized by the passive type sensor tag device, and an increase in a communication distance can be realized.

EXPLANATIONS OF LETTERS OR NUMERALS

1 . . . antenna (divided microstrip antenna)
2 . . . modulation means
3 . . . oscillator
4 . . . boost rectification circuit/ASK modulation circuit
5 . . . charge pump
6 . . . generation means A
7 . . . generation means B
8 . . . rise control circuit
9 . . . power supply synthesis circuit
10 . . . time constant circuit
11 . . . sensor
12 . . . control circuit (microprocessor/non-volatile memory/AD converter)
D1, D2 varactor diode
D3 to D18 schottky barrier diode
D19 to D25 zener diode
Q1 to Q3 NPN transistor
Q4, Q5 N-channel MOSFET
RS thermistor
L1, L2 strip conductor
L3 λ/4 short stab
C1 to C18 capacitor
R1 to R25 resistor
U1 inversion logical circuit
U2 non-inversion (buffer) logical circuit U3 open drain type inversion logical circuit
U4 AND inversion/output logical circuit
U5 inversion logical circuit
U6 schmidt trigger type inversion logical circuit
U7 microprocessor
U8 oscillation circuit

BEST MODE(S) FOR CARRYING OUT THE INVENTION

Figure 1:
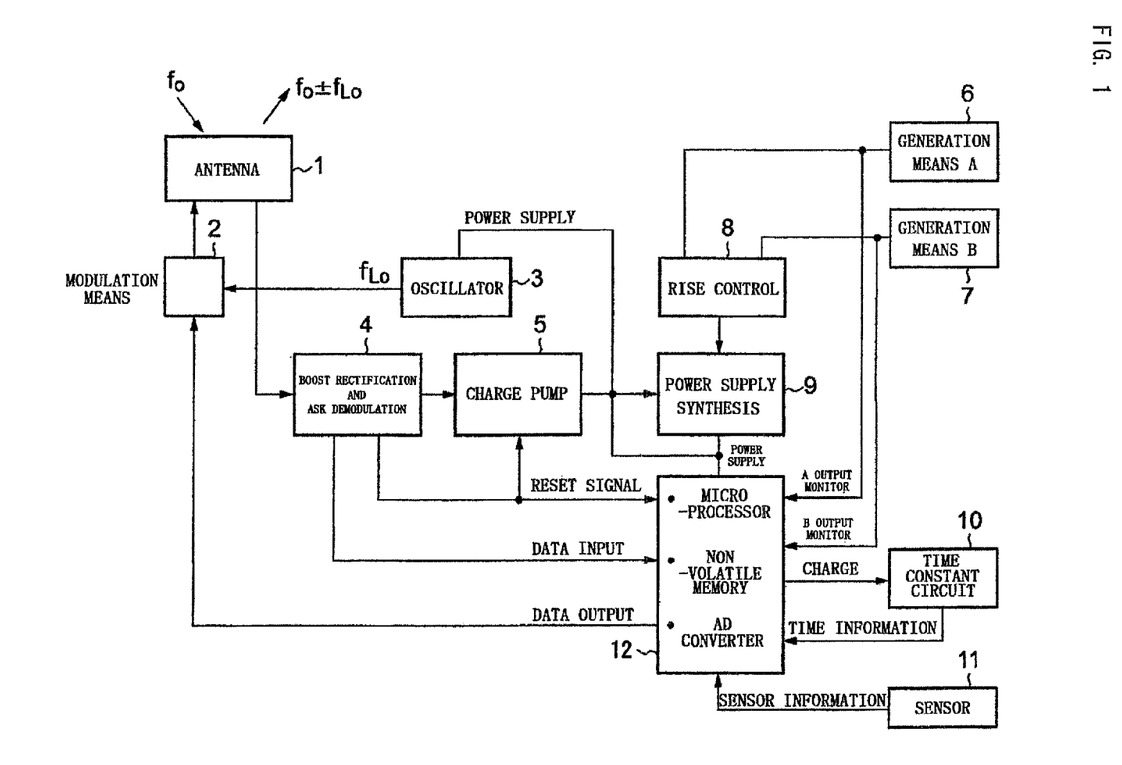
FIG. 1 is a block diagram of a passive type sensor tag device according to an embodiment of the present invention.

FIG. 1 shows a block diagram of a passive type sensor tag device according to an embodiment of the present invention.

In FIG. 1, reference numeral 1 denotes an antenna (divided microstrip antenna); 2, modulation means; 3, an oscillator; 4, a composite circuit including a boost rectification circuit and an ASK demodulation circuit; 5, a charge pump; 6, generation means (A); 7, generation means (B); 8, a rise control circuit; 9, a power supply synthesis circuit; 10, a time constant circuit; 11, a sensor; and 12, a control circuit (having a built-in microprocessor/non-volatile memory/AD converter).

The sensor tag device according to this embodiment has the following characteristics.
(1) A part of a boost rectification circuit (see Japanese Patent Application Laid-open No. 2004-304876) called a Cockcroft-Walton circuit in which a plurality of rectifier diodes and a plurality of capacitor are ladder-connected is utilized to provide ASK demodulation means.
(2) An output signal from the ASK demodulation means is utilized to reset a microprocessor and operate the charge pump for a power supply voltage.
(3) An output signal from the ASK demodulation means is utilized to input data to the microprocessor.
(4) The sensor tag device has generation means utilizing one or more changes in an environment (e.g., vibrations, a temperature, a pressure, light, and others), power supply voltage rise control means, and power supply synthesis means to inform the microprocessor of supply of a power and a factor of occurrence of an event when the environment changes (an event occurs).
(5) The sensor tag device has a time constant circuit, which starts charging under control of the microprocessor so that charge elapsed time information can be read by the microprocessor.

Based on these characteristics, the sensor tag device according to this embodiment can realize the following functions. (A) When an event occurs, a factor of occurrence of this event, sensor data, and event information such as an event occurrence time are stored in an internal non-volatile memory in the microprocessor, and such information can be wirelessly sent back upon receiving an inquiry command from an inquirer.
(B) When the event occurs, the factor of occurrence of the event, the sensor data, and the event occurrence time can be wirelessly sent back with respect to an inquirer carrier signal.
(C) A command ID code as well as time information or sensor information in the sensor tag can be stored in the internal non-volatile memory when a write command from the inquirer is received, and such information can be wirelessly sent back when an inquiry command from the inquirer is received.

Figure 2:
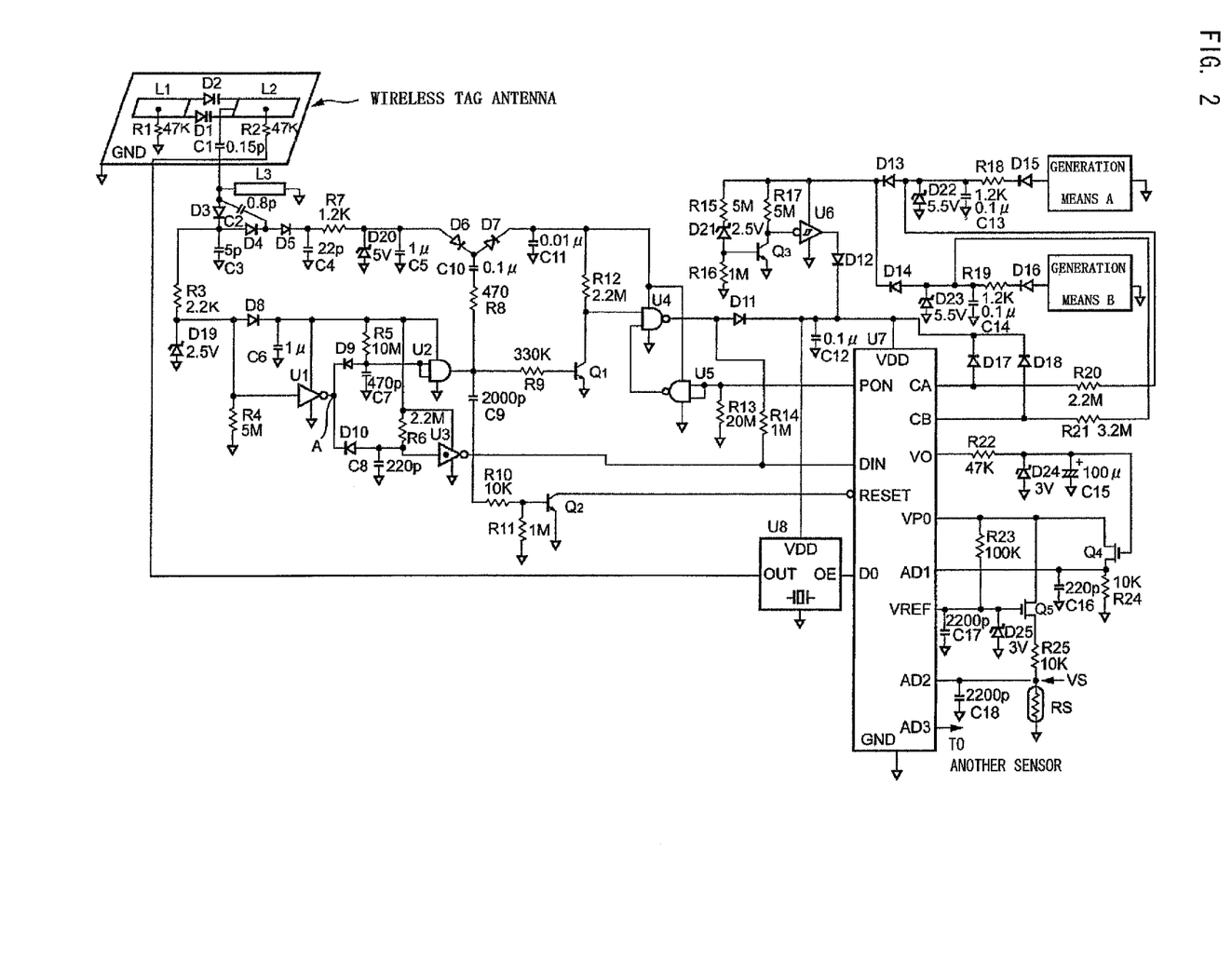
FIG. 2 is a circuit diagram of a basic structure of the passive type sensor tag device according to an embodiment of the present invention.

FIG. 2 shows a circuit diagram of a basic structure of the passive type sensor tag device according to the embodiment of the present invention, and this drawing shows the block diagram of FIG. 1 in more detail. The sensor tag device according to this embodiment will be specifically explained hereinafter with reference to this FIG. 2.

L1 and L2 denote strip conductors, which are connected with each other through varactor diodes D1 and D2 and combined with a bottom board conductor (GND) to constitute a divided mnicrostrip antenna.

L3 designates a $\lambda/4$ short stab which constitutes a boost rectification circuit by also using Schottky barrier diodes D3, D4, and D5 and capacitors C1, C2, C3, and C4.

Resistors R1 and R2 are used to apply bias voltages to the varactor diodes D1 and D2 and change operation characteristics of the divided microstrip antenna, thereby modulating and reflecting an incident carrier signal to send back information.

A zener diode D20 and a resistor R7 limit a voltage to prevent an output voltage from the boost rectification circuit formed of the $\lambda/4$ short stab L3, the Schottky barrier diodes D3, D4, and D5 and the capacitors C1, C2, C3, and C4 from becoming a fixed value or above. A capacitor C5 smoothes an output from the boost rectification circuit to suppress a fluctuation in a voltage caused due to a fluctuation in a load.

Since a resistor R3 takes out an output voltage at a middle stage of a ladder rectification circuit, a zener diode D19 limits the output voltage from becoming a fixed value or above. Further, this output signal taken out by the resistor R3 has a lower voltage value than an output from a last stage of the ladder rectification circuit, and a short time constant can respond to an ASK modulation signal input to the ladder rectification circuit.

A Schottky barrier diode Do is used to charge a capacitor C6 with an output taken out from the middle stage of the ladder rectification circuit. Electric charges stored in the capacitor C6 are utilized as powers for logical circuits U1, U2, and U3. A register R4 prevents a backward leak current of a Schottky barrier diode D8 from affecting an input voltage when the output signal taken out from the middle stage of the ladder rectification circuit is applied to the logical circuit U1 to shape a waveform.

An output of the inversion logical circuit U1 is connected with a reset signal detection circuit which is formed of a diode D9, a resistor R5 and a capacitor C7 and has a time constant of 2 to 3 ms and a data signal detection circuit which is formed of a diode D10, a resistor R6, and a capacitor C8 and has a time constant of approximately 0.2 ms. An output signal from the reset signal detection circuit is subjected to waveform shaping by the non-inversion logical circuit U2, and an output signal from the data signal detection circuit is subjected to waveform shaping by the open drain type inversion logical circuit U3.

A reset signal output from the non-inversion logical circuit U2 is differentiated by a differentiation circuit formed of a capacitor C9 and resistors R10 and R11 to drive an NPN transistor Q2, and input to a reset signal terminal (Reset) of a microprocessor U7. The reset signal terminal (Reset) input of the microprocessor U7 is pulled up therein to a power supply terminal voltage VDD of the microprocessor U7 by a resistance of approximately 100 k$\Omega$.

An output voltage (voltage with which the capacitor C5 is charged) of the boost rectification circuit is charge-pumped through a resistor R8, a capacitor C10, and diodes D6 and D7 with a reset signal output from the non-inversion logical circuit U2 to charge a capacitor C11. When the capacitor C11 is charged by using the reset signal, a voltage of the capacitor C11 can be boosted to approximately 1.5-fold of a voltage with which the capacitor C5 is charged.

The electric charge with which C11 is charged serves as powers for logical circuits U4 and U5 and also used to charge a capacitor C12 via the AND inversion and output logical circuit U4 and a diode D11 and supply powers to the microprocessor U7 and an oscillation circuit U8.

Here, in regard to an operation of the AND inversion and output logical circuit U4, this circuit supplies the powers to the microprocessor U7 and the oscillation circuit U8 through the diode D11 when one input is changed to a Low level by the resistors R9 and R12 and the NPN transistor Q1 or when the microprocessor U7 operates to identify a power supply ON state and a High level is output to a power-on output terminal (PON) to be converted into a Low level and the other input is changed to the Low level by the inversion logical circuit U5 in a period where the reset signal is output from the non-inversion logical circuit U2. A relatively large current continuously flows and the electric charge stored in the capacitor C5 is wastefully consumed if the microprocessor U7 and the oscillation circuit U8 try executing a reset operation or a power supply ON sequence under power supply voltage conditions which are insufficient for operations, and such a scheme is taken to avoid this situation. After end of the reset operation and the power supply ON sequence, an operation threshold power supply voltage and a consumption current of the microprocessor U7 are reduced.

It is to be noted that the power-on output terminal (PON) of the microprocessor U7 takes a tristate (High, Low, high impedance), and hence a high-impedance state continues until the power supply ON sequence is finished, and a resistor R13 is inserted to determine an input of the inversion logical circuit U5 to the Low level for the purpose of preventing a logic from being determined during a period of the power supply ON sequence. Further, a resistor R14 is a pull-up resistor, which is used to match a data signal output level of the open drain type inversion logical circuit U3 with an operation signal level of the microprocessor U7. A data signal output from the open drain type inversion logical circuit U3 is input to a data input terminal (DIN) of the microprocessor U7.

Each of the generation means A and B is, e.g., a generation means (piezoelectric element, peltiert device, solar cell, micro generator (very small electric machine which receives a mechanical motive energy to generate a power)) that generates a power based on one or more changes in an environment (e.g., vibrations, heat, light, a pressure, and others). A capacitor C13 is charged with an output from the generation means A via a diode D15 and a resistor R18. A capacitor C14 is charged with an output from the generation means B via a diode D16 and a resistor R19. Zener diodes D22 and D23 are inserted to prevent voltages formed of electric charges stored in the capacitor C13 or the capacitor C14 from exceeding fixed values, respectively.

Voltages formed of the electric charges stored in the capacitors C13 and C14 are combined with each other via the diodes D13 and D14 to serve as a power for a schmidt trigger type inversion logical circuit U6. Furthermore, this voltage is connected with a collector of an NPN transistor Q3 through a resistor R17 and also connected with a base of the NPN transistor Q3 via a resistor R15, a zener diode D21, and a resistor R16.

The zener diode D21 operates the NPN transistor Q3 to change an input of the schmidt trigger type inversion logical circuit U6 to the Low level when a power supply voltage of the schmidt trigger type inversion logical circuit U6 is increased to a fixed value or above. As a result, an output terminal of the schmidt trigger type inversion logical circuit U6 is changed to High to supply powers to the microprocessor U7 and the power supply terminal VDD of the oscillation circuit U8 via the diode D12. That is, even if a high-frequency power from the wireless tag antenna is insufficiently supplied or not supplied at all, the generation means A or the generation means B can supply the power enabling operations of the circuits in the sensor tag device under environmental conditions, and the sensor tag device can thereby record occurrence of an event.

Resistors R20 and R21 supply output states of the generation means A and B to CA and CB input terminals of the microprocessor U7. Diodes D17 and D18 are utilized for the purpose of preventing a voltage exceeding an operation level of the microprocessor U7 from being input to CA and CB.

The microprocessor U7 confirms input states of the input terminals CA and CB to specify a factor of occurrence of an event after end of the power supply ON sequence, and measures input voltage values at analog signal input terminals AD1 and AD2 to record digital data in the non-volatile memory in the microprocessor U7.

An output terminal VO of the microprocessor U7 takes a tristate, and it becomes the High level only during a period of a time constant circuit charge command (input from a DIN terminal of the microprocessor U7) received from the inquirer, or enters a high-impedance state under any other conditions. An output terminal VO of the microprocessor U7 charges a capacitor C15 via a resistor R22. A zener diode D24 prevents a charging voltage of the capacitor C15 from being increased to a fixed value or above.

A voltage at the capacitor C15 is gradually reduced over a long period of time by a small leak current of the zener diode D24. Measuring an input voltage level of the analog input terminal AD1 enables measuring elapse of a time of a change in the voltage at the capacitor C15.

When measuring voltage values at the analog input terminals AD1 and AD2, the microprocessor U7 sets an output terminal VPO to the High level to produce a fixed voltage in a zener diode D25 via a resistor R23. The voltage in the zener diode D25 is input to a reference voltage input terminal VREF of the microprocessor U7 to serve as a reference voltage of an analog-digital (AD) converter. A capacitor C17 is inserted for the purpose of preventing the reference voltage input terminal VREF from being affected by noise.

Moreover, the output terminal VPO is connected with a drain of an N-channel MOS transistor Q4 to monitor a voltage at C15 with respect to a resistor R24 through a source follower, and input it to AD1. A capacitor C16 is utilized to avoid an influence of noise. Additionally, VPO is also connected with a drain of an N-channel MOS transistor Q5 to supply a voltage generated in the zener diode D25 to a resistor R25 and a thermistor element RS via the source follower. A voltage VS divided by the resistor R25 and the thermistor element RS is supplied to the analog input terminal AD2. In regard to a temperature of the tag, a change in a resistance of the thermistor element RS can be known by measuring an input voltage of the analog input terminal AD2. It is to be noted that a capacitor C18 is inserted to the analog input terminal AD2 for the purpose of avoiding an influence of noise The oscillation circuit U8 oscillates with a fixed frequency. An output terminal DO of the microprocessor U7 is used to control a signal output from an output terminal OUT of the oscillation circuit U8. That is, an output signal from the output terminal. DO of the microprocessor U7 is used to perform ASK modulation with respect to an oscillation output (serving as a carrier for return information) from the oscillation circuit U8. The output terminal OUT of the oscillator U8 applies bias voltages to the varactor diodes D1 and D2 of the wireless tag antenna via the resistor R2 to periodically changes operating conditions of the wireless tag antenna connected with the varactor diodes D1 and D2, thereby producing a return signal (modulated reflection wave of an incident electromagnetic wave).

Here, when a Cockcroft-Walton circuit is used as the boost rectification circuit, ladder-connecting a plurality of rectification diodes and capacitors enables rectifying and outputting a sinusoidal signal having an amplitude Vi as a direct-current voltage K (Vi-lj) [K is a ladder step number, lj is a forward drop voltage of the diodes] higher than Vi. However, when this circuit is to be used in a high-frequency band (e.g., 2.45 GHz), since a junction capacitance of each diode serves as an input load, an input impedance becomes very low, and an output voltage is reduced.

In the boost rectification circuit according to the present invention, an Nλg/4 short stab (λg is an effective wavelength of a transmission path—N is an odd number and 1 or 3 is used) can provide an inductance equivalent impedance having a high Q value in a high-frequency band with respect to an input signal having a wavelength near λg. Even if a ladder boost section has a capacitive load, an inductive impedance can be maintained by performing a parallel resonance operation.

It is to be noted that the example of using the generation means A and B in the circuit depicted in FIG. 2 has been explained, but the number of the generation means may be increased or decreased as required. Further, a type of the generation means is selected and used in accordance with, e.g., an intended use of a product.

Furthermore, the above-explained types/numbers of the elements or circuit constants (resistors, capacitors, and others) in FIG. 2 are just the examples used for trial manufacture of the sensor tag device according to the present invention by the present inventors, and the present invention is not restricted thereto. At this time, a storage capacitance of the capacitor C is appropriately set based on an operation environment, e.g., the number or types/functions of U1 to U7 to be used.

Moreover, using an oscillation element whose oscillation frequency varies due to a temperature or a pressure as the oscillation circuit U8 enables performing monitoring in real time.

Figure 3:
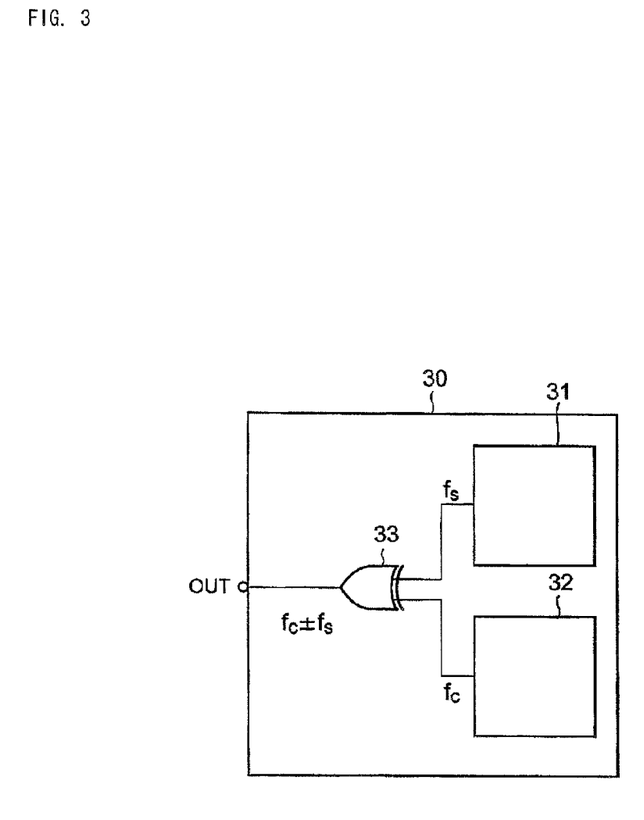
FIG. 3 is a principle view of a frequency reading error prevention circuit utilizing a Doppler effect.

At this time, using an oscillator 30 shown in FIG. 3, instead of the oscillation circuit U8, that outputs a signal in which an output signal (frequency fs) from an oscillation circuit 31 whose oscillating frequency varies due to a temperature or a pressure and an output signal (frequency fc) from an oscillation circuit 32 having a fixed frequency are mixed enables avoiding a reading error owing to a Doppler effect.

Here, it is assumed that fo is a carrier frequency from the inquirer and fd is a Doppler frequency. However, fo>>fc, fs is achieved.

In the inquirer, for example, the following are received.

$$fo+fc+fs+fd \quad \text{(Expression 1), and}$$

$$fo+fc-fs+fd \quad \text{(Expression 2)}$$

Then, since (Expression 1)−(Expression 2)=2fs is achieved, an output signal fs from the oscillation circuit 31 can be taken out.

Further, the following can be also received.

$$fo-fc-fs+fd \quad \text{(Expression 3), and}$$

$$fo-fc+fs+fd \quad \text{(Expression 4)}$$

(Expression 1)−(Expression 4)=2fc (Expression 1)+(Expression 3)=2(fo+fd)

Therefore, fs, fc, and fd can be measured.

Figure 4:
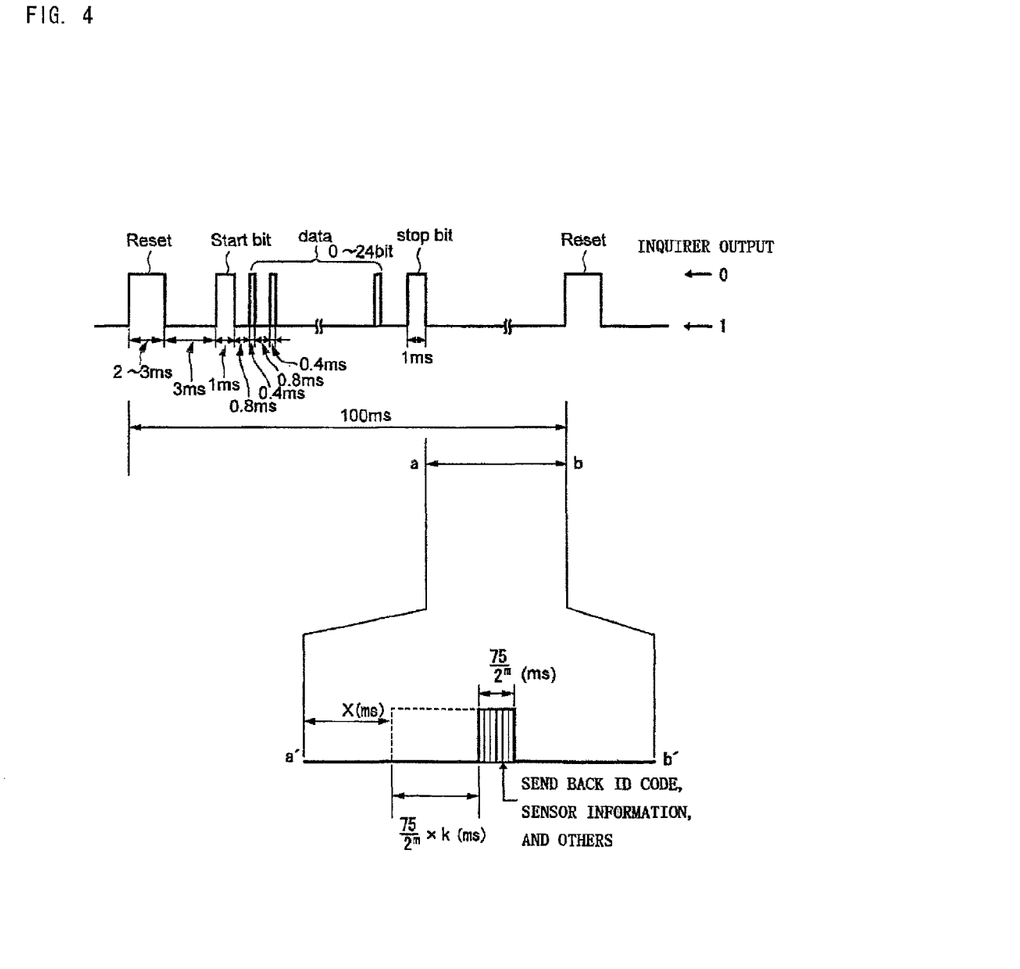
FIG. 4 shows a reception signal waveform from an inquirer at a point A in FIG. 2, in which a waveform of D0 between a and b is shown between a' and b' in an enlarged manner.

Meanwhile, in the sensor tag device according to this embodiment, as shown in FIG. 4, the following anti-collision protocol can be also utilized.

(Object)

A wireless tag inquirer, a response wireless tag, and a communication protocol for them are provided to simultaneously detect a plurality of wireless tags. An anti-collision method, a tag activating method, and an operating limit condition detecting method will now be explained hereinafter.

(Operation Outline)

(1) The inquirer transmits a tag reset signal (which is also used for activation) and an inquiry ID code approximately every 100 ms.

(2) The tag reset signal from the inquirer is a "0" output (carrier stop) of 2 to 3 ms, a reset synchronization timing (preparation for receiving the inquiry ID code) is given when the tag is activated, and a power-on reset operation is given when the tag is not activated.

(3) A power flag is reset after the tag performs a power-on reset operation, and the power flat is set after a timer waiting period of 100 ms or slightly below (checking a power supply voltage<within 10% of a clock error>).

(4) When the reset operation is performed in a state where the power flat is set, the processing waits for receiving an inquirer output "0" of approximately 1 ms (ID code Start bit).

(5) After receiving the ID code Start bit, an ID code bit having a width of 0.4 ms, which is received, at intervals of approximately 1.2 ms is recorded. It is determined that a bit number N of the ID code to be received falls within the range of 0 to 24. It is assumed that the inquirer output "0" of approximately 1 ms is received at the end of the ID code (ID code Stop bit).

(6) Although the maximum inquiry ID code is 24 bits, it substantially corresponds to 20 bits since a retiming "0" bit is inserted every 5 bits. At a retiming bit position, resynchronization is executed to correct a clock error of the microprocessor.

(7) The inquirer ID code is transmitted from higher-order bits, and each deficient bit in 24 bits is determined as a Mask bit "M".

(8) After receiving the ID code Stop bit, when a tag ID matches with the inquiry ID code (including the Mask bit), a burst sub-carrier or data is sent back at the following timing.

Width: 75/2 m (ms)

Delay: 75/2 m×k+x (ms)

However, m≦M is achieved, and a maximum value of m is 6 bits.

It is to be noted that k is a numerical value of lower-order m (bits) in the tag ID code (where k=0 when m=0) and x is a fixed value.

(9) The inquirer can utilize the inquiry ID code and information of a timing of a return signal to search the tag ID. Furthermore, when detecting a tag position, M=0 is assumed and a burst return signal of 75 ms is utilized to specify a delay time difference between a plurality of reception antennas, thereby effecting hyperbolic search.

In this manner, adopting a circuit in which the impedance conversion boost mode based on stab resonance is combined with the ladder boost mode enables obtaining a reception voltage that is fivefold or above of that in the conventional method.

INDUSTRIAL APPLICABILITY

The sensor tag device according to the present invention is utilized as a passive type wireless tag device with a sensor having no battery, and since it can be used in a 2.45 GHz band at a range of approximately 30 m while assuring a long wireless communication range, save supply of a power for a microprocessor, and constantly detect event data by using a sensor tag even though electric waves are not received, a factor of occurrence of an event, sensor data (e.g., event detection data), and event information, e g., an event occurrence time can be stored in an internal non-volatile memory when this event occurs and such stored information can be wirelessly sent back with respect to an inquiry wirelessly transmitted from an inquirer, for example. Therefore, for example, when confirming a history of a change in an ambient temperature or a history of, e.g., light/vibrations at a later stage is desired in regard to foods or some of industrial products, or when confirming a history of, e.g., a load (strain or acceleration) on buildings or large constructions after an earthquake and others at a later stage is desired, handing various kinds of conditions, e.g., a monitoring target or a history target as an event enables utilizing the sensor tag device according to the present invention.

Moreover, when a large variety of the sensor tag devices according to the present invention requiring no maintenance, e.g., battery replacement are extensively arranged, these devices can be utilized to configure a new information system or a safety management system that compositely/integrally analyzes event data.

The invention claimed is:

1. A sensor tag, comprising:
a transmission/reception antenna, a power receiving circuit, and a microprocessor,
wherein the power receiving circuit enabling bi-directional communication is combined with a stab resonance boost circuit and a ladder boost rectification circuit,
the ladder boost rectification circuit comprises an input connected to an antenna power feed point for receiving a single phase input signal,
the ladder boost rectification circuit boosting and rectifying the single phase input signal,
the ladder boost rectification circuit further comprising a Cockcroft-Walton circuit formed of a plurality of diodes, a plurality of ground-side capacitors, and a plurality of power-receiving-side capacitors, where a first diode on an input side being removed and a capacitance value of each power-receiving-side capacitor being smaller than a capacitance value of each ground-side capacitor, with the stab resonance boost circuit being used for the removed first diode on the input side at the input connected to the antenna power feed point.

2. A sensor tag of claim 1, wherein a divided microstrip antenna is the transmission/reception antenna, the divided microstrip antenna being a linear strip conductor, divided and connected to each other, at a divided position into two linearly aligned sections.

3. The sensor tag according to claim 2, wherein the divided position of the strip conductor of the divided microstrip antenna deviates from the center of a length of the strip conductor.

4. The sensor tag according to claim 1, wherein a signal is taken out from a middle stage of the ladder boost rectification circuit, and a part of the power receiving circuit is utilized as an ASK demodulation circuit.

5. The sensor tag according to claim 4, wherein an output signal from the ASK demodulation circuit is utilized and an output voltage from a last stage of the ladder boost rectification circuit is charge-pumped to serve as a power supply voltage of the microprocessor.

6. The sensor tag according to claim 5, wherein a power sufficient for initialization and a reception sequence operation is supplied to the microprocessor by inputting a reset signal to the microprocessor in synchronization with the charge pump operation.

7. The sensor tag according to claim 6, wherein the reset signal is transmitted from an inquirer in a cycle T, and the microprocessor enables an output required to continuously supply a power after end of a power supply ON sequence and then resets an internal power flag, sets a timer waiting period slightly shorter than the reset cycle T, and thereafter sets the internal power flag at the end of the timer waiting period to detect that a power supply voltage is equal to or above a stable operation threshold value of the microprocessor.

8. The sensor tag according to claim 7, wherein a primary delay circuit having a long time constant and a primary delay circuit having a short time constant are used with respect to the ASK demodulation signal to take out and utilize a reset signal and a serial data signal.

9. A sensor tag device comprising:
a power generation means utilizing one or more changes in an environment to generate power as a power supply;
power supply voltage rise control means connected to control said power generation means, said power supply voltage rise control means controlling a power supply voltage by a Schmidt trigger threshold value;
a microprocessor connected to receive generated power from the power generation means, wherein a single or synthesized supply power is supplied to the microprocessor through the power supply voltage rise control means; and
power supply synthesis means which synthesizes the power supply voltage obtained from the generation means,
wherein a change in the environment is determined as an event, and event data is stored in the microprocessor at the same time not receiving the power supply except from the generation means when this event occurs.

10. The sensor tag device according to claim 9, having a time constant circuit that can be charged with electric charges under tristate control of the microprocessor, wherein the microprocessor reads information of a time elapsed from charging by monitoring the terminal voltage $Vc=Q/C$ of the time constant circuit with high input impedance.

11. A sensor tag device comprising the sensor tag according to claim 1 and having: power generation means for utilizing one or more changes in an environment to generate power; power supply voltage rise control means; and power supply synthesis means, wherein a change in the environment is determined as an event, a power is supplied to a microprocessor and event data is transmitted at the same time to be stored in the microprocessor when this event occurs.

12. The sensor tag device according to claim 11, having a time constant circuit that can be charged with electric charges under control of the microprocessor, wherein the microprocessor reads information of a time elapsed from charging.

13. The sensor tag device according to claim 11, wherein, using power from the power generation means, an event factor and a sensor data are wirelessly sent back with respect to an inquirer carrier signal when an event occurs.

14. The sensor tag device according to claim 11, wherein, using power from the power generation means, an event factor, sensor data, and information of an occurrence time are stored in a non-volatile memory in the microprocessor when an event occurs, and such information is wirelessly sent back when the inquirer inquires.

15. The sensor tag device according to claim 11, wherein time information and sensor information in the tag are stored in the non-volatile memory in the microprocessor when the inquirer issues a writing request, and such information is wirelessly sent back when the inquirer inquires.

16. A power receiving circuit comprising:
  an antenna power feed point;
  a capacitive power feed impedance;
  a circuit which includes a stab resonator and a ladder boost rectification circuit connected with the antenna power feed point through the capacitive power feed impedance whose capacitance is adequately small to around 1 pF to 0.1 pF being divided by the using frequency per GHz unit,
  wherein said ladder boost rectification circuit operates only by single phase input signal,
  wherein said circuit boosts an RF input signal by a bottom board conductor, and also boosts and rectifies an input signal supplied from the antenna power feed to feed a power to an external load,
  wherein the power receiving circuit resonates the short stab resonator and the capacitive power feed impedance whose capacitance is adequately small in series, and the power receiving circuit resonates the short stab resonator and a capacitive load impedance formed of the ladder boost rectification circuit in parallel so that a high Q value is realized and the power conversion efficiency is improved.

17. The power receiving circuit according to claim 16, wherein,
  the circuit which includes the stab resonator and the ladder boost rectification circuit comprises a Cockcroft-Walton circuit formed of a plurality of diodes, a plurality of ground-side capacitors, and a plurality of power-receiving-side capacitors,
  the ladder boost rectification circuit operates only by single phase input signal,
  the ladder boost rectification circuit is a circuit in which a first diode on an input side is removed and a capacitance value of each power-receiving-side capacitor is about one-tenth smaller than a capacitance value of each ground-side capacitor, and a high-frequency high impedance is received in a direct-current short circuit from the short stab resonator.

18. A sensor tag device power supply method, the sensor tag device comprising a stab resonator and a ladder boost rectification circuit, the method comprising:
  achieving connection of a single-phase input signal through an antenna power feed point and a capacitive power feed impedance;
  resonating the stab resonator and the capacitive power feed impedance in series to boost the input signal; and
  resonating the stab resonator and a capacitive load impedance formed of the ladder boost rectification circuit in parallel for maintaining an inductive impedance while boosting and rectifying the input signal supplied from the antenna power feed point to feed a power to an external load,
  wherein the ladder boost rectification circuit comprises an input connected to an antenna power feed point for receiving the single phase input signal, the ladder boost rectification circuit further comprising a Cockcroft-Walton circuit formed of a plurality of diodes, a plurality of ground-side capacitors, and a plurality of power-receiving-side capacitors, where a first diode on an input side being removed and a capacitance value of each power-receiving-side capacitor being smaller than a capacitance value of each ground-side capacitor, with the stab resonance boost circuit being used for the removed first diode on the input side at the input connected to the antenna power feed point.

19. The sensor tag device according to claim 12, wherein an event factor and a sensor data are wirelessly sent back with respect to an inquirer carrier signal when an event occurs.

20. The sensor tag device according to claim 12, wherein an event factor, sensor data, and information of an occurrence time are stored in a non-volatile memory in the microprocessor when an event occurs, and such information is wirelessly sent back when the inquirer inquires.

\* \* \* \* \*

UNITED STATES PATENT AND TRADEMARK OFFICE
CERTIFICATE OF CORRECTION

PATENT NO.         : 8,493,181 B2
APPLICATION NO.    : 11/995691
DATED              : July 23, 2013
INVENTOR(S)        : Kitayoshi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1390 days.

Signed and Sealed this
Eighth Day of September, 2015

Michelle K. Lee
*Director of the United States Patent and Trademark Office*